June 22, 1954  B. L. DYNER  2,681,588
VIBRATING REED DEVICE
Filed April 8, 1952

Inventor:
Benjamin L. Dyner
by his Attorneys
Howson & Howson

Patented June 22, 1954

2,681,588

UNITED STATES PATENT OFFICE 2,681,588

VIBRATING REED DEVICE

Benjamin L. Dyner, Philadelphia, Pa., assignor to James G. Biddle Company, Philadelphia, Pa., a corporation of Pennsylvania Application April 8, 1952, Serial No. 281,088

5 Claims. (Cl. 84—456)

This invention relates to improvements in vibrating reed devices. It further relates to improvements in vibrating reed frequency meters of the multi-reed type, but it is to be understood that the invention is not limited thereto. It may be used in any vibrating reed device which requires a large amplitude of reed vibration in combination with a sharpness of tuning that normally is not associated with such amplitude.

Vibrating reed devices, such as multi-reed frequency meters, as heretofore constructed, have been inherently deficient in that it has been impossible to increase the sharpness of tuning of the reeds without decreasing the amplitude of vibration. To explain this, consider a simple unweighted reed with a light flag at the free end such as used heretofore in multi-reed frequency meters. If such a reed is deflected momentarily and released, it will oscillate at its natural frequency $f$, and the oscillations will decay gradually according to a logarithmic decrement $\delta$. The quantities $f$ and $\delta$ are determined by the manner in which the reed is mounted, by the characteristics of the material of which the reed is made, and by the physcial dimensions of the reed. If it is desired to decrease the value $\delta$ for a particular reed structure and so increase the sharpness of tuning, it is necessary to increase the reed thickness. Further decrease in $\delta$ is obtained by adding weight to the reed, preferably at the tip. The increased thickness reduces the decrement but increases the frequency $f$, if the length is maintained constant, in accordance with the well-known equation, $$f = \frac{H}{L^2} K$$

where H is the reed thickness, L is length and K is an appropriate constant. The frequency can be brought back to the original value by adding weight to the reed tip. The increased thickness, however, causes increased stress for a given amplitude, and since stress is the limiting factor the thicker reed cannot be operated at as great an amplitude as it could before its thickness was increased. Therefore, in the past, whenever a certain amplitude of vibration was necessary at a certain frequency, it was impossible to reduce the decrement $\delta$ below a certain minimum value, and hence it was impossible to increase the sharpness of tuning beyond a certain limit.

The principal object of the present invention is to provide a novel reed structure which enables attainment of lower decrements and hence greater sharpness of tuning, without sacrifice of amplitude.

In accordance with the invention, an auxiliary or secondary reed is interconnected with the primary reed so that the two effectively form a tuning fork. The primary reed remains thick and unweighted. The secondary reed is approximately the same length but is relatively thick and weighted, and has the same resonant frequency as the primary reed. The decrement of such a device is much lower than that of the primary reed when separately mounted. Moreover, the amplitude of the primary reed can be just as great in this device as it is when the reed is mounted separately. The secondary reed governs the sharpness of tuning without affecting the amplitude of the primary reed.

The invention may be more clearly understood by reference to the accompanying drawing, in which.

Figure 4:
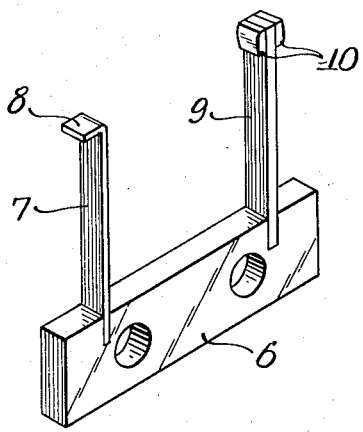
Fig. 4 is a perspective view of one of the resonant elements.

In the structure illustrated, there are five resonant elements or tuning forks numbered 1 to 5, each tuned to resonate at a certain predetermined frequency. Each resonant element is of the form shown clearly in Fig. 4 and is composed of a bar 6, a slender reed 7 with a flag 8, and a relatively thick reed 9 with weight 10. It will be understood that the weighting and thickness of the secondary reed are such as to give the desired sharpness of tuning while preserving the desired frequency. The resonant elements are mounted on two parallel pins 11 and 12 placed as nearly as possible through the nodes of each bar 6 and supported by spaced vertical supports 13 and 14 extending upward from base 15. According to the theory of vibrating bars as developed by Lord Rayleigh and set forth in his book, "Theory of Sound," these nodes are located on the neutral axis of bending and 22.4 percent in from the ends of the bar.

With the pins properly located, there is a minimum transfer of energy from each resonant element to the pins and thence to the supports 13 and 14 and base 15. In order to prevent transfer of energy from each resonant element to adjacent elements, while maintaining proper alignment of the elements on the pins, bushings 16 of silicone rubber or other suitable material are used to mount the elements on the pins, and washers 17 of similar or like material are placed on the pins between the resonant elements and at the ends of the assembly. Pairs of collars 18 and 19, with set screws, serve to hold each assembly firmly together and may be positioned to exert inward pressure. If desired, the pins 11 and 12 may be threaded and the collars 18 and 19 may be internally threaded accordingly.

Figure 1:
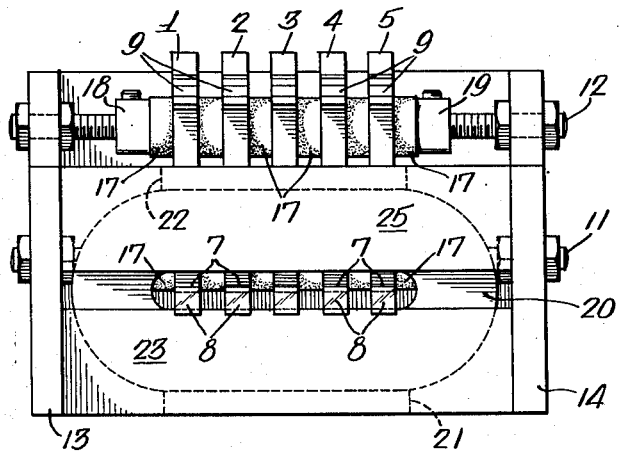
Fig. 1 is a plan view of a multi-reed structure constructed according to one embodiment of the invention.
Figure 2:
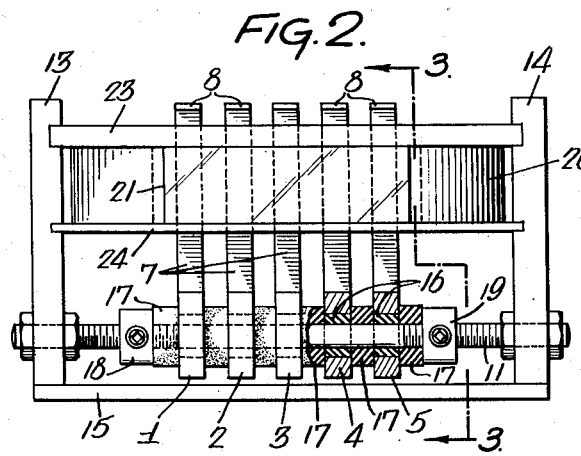
Fig. 2 is a front elevational view of the same.
Figure 3:
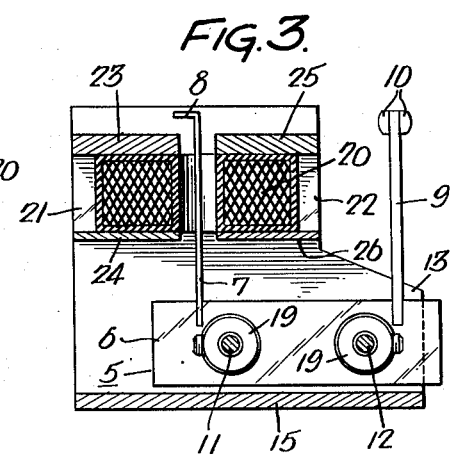
Fig. 3 is a sectional view taken on line 3—3 of Fig. 2.

In order to make use of this arrangement of resonant elements as a frequency indicator, an electromagnetic drive may be employed, as shown in Figs. 1 to 3. The drive may comprise a coil 20, permanent magnets 21 and 22, and pole pieces 23 to 26, supported by the supports 13 and 14. With the arrangement shown, it is necessary that supports 13 and 14 be formed of non-magnetic material. The primary reeds 7 extend within the coil and between the opposed pole pieces. The latter, together with the permanent magnets, form magnetic paths about the coil which include air gaps that vary with motion of the associated reed. When an alternating current is passed through the coil 20, an alternating force is applied to the reed.

If the amplitude of the applied current is maintained constant while the frequency is varied, the amplitude of each reed 7 will be negligible until the resonant frequency of the resonant element is approached. As the frequency is swept slowly through resonance of a particular element, the amplitude of the reed motion will build up to a peak and then decay. The closeness to which the resonant frequency can be approached before noticeable increase in amplitude can be seen is a measure of the sharpness of resonance.

The sharpness of tuning depends on the losses in the system. A tuning fork structure has much lower losses than unbalanced structures. When any of the resonant elements 1 to 5 acts as a balanced structure, the losses are lowest and the tuning is sharp. With a two thickness fork the resonant element only acts as a fork when both reeds are resonating. It will be seen that the reed with the sharper characteristic will govern the action. Each resonant element will therefore have a sharpness of resonance that is characteristic of the thicker reed.

The thickness of the thicker tine or reed, in relation to the thickness of the thinner reed, may vary considerably, according to the desired sharpness of tuning. In one physical embodiment, it was found desirable to have the thickness of each secondary reed about twice the thickness of the associated primary reed.

As previously indicated, and as shown in the drawings, concentrated weight is applied at or about the tip of the secondary reed, such weighting of the reed being effective in providing the desired decrement and hence the desired sharpness or tuning. A preferred method of adding concentrated weight to the tip of a reed consists of molding a mass of solder to the reed tip either in a suitable mold or by carefully working with a soldering iron at a temperature at which the solder is in a plastic condition. Once such a mass has been built up on the tip of the reed, the frequency may be varied higher or lower by adding or filing away the solder.

While a particular embodiment of the invention has been illustrated and described, the invention is not limited thereto but contemplates such modifications and other embodiments as may be resorted to without departing from the principles of the invention. Moreover the invention is applicable to a device employing only one resonant element and is not limited to devices employing a plurality of such elements. For example, the invention is applicable to circuit controlling devices such as reed relays, and the resonant element may carry a contact for that purpose.

I claim:

1. A vibrating reed unit, comprising a base portion adapted for mounting, a relatively thin primary reed extending from said base portion, said reed being of a predetermined thickness and a predetermined length to have a predetermined resonant frequency but by virtue of its being thin having insufficient sharpness of tuning by itself, and a relatively thick secondary reed extending from said base portion and having a weight at its end, said secondary reed being of a predetermined thickness and a predetermined length to have the same resonant frequency as said primary reed, the thickness of said secondary reed and the weight at its end being such as to impart predetermined sharpness of tuning to the unit without affecting the frequency and amplitude of the primary reed.

2. A vibrating reed unit, comprising a bar having means to mount the same at its nodes, a relatively thin primary reed extending from said bar, said reed being of a predetermined thickness and a predetermined length to have a predetermined resonant frequency but by virtue of its being thin having insufficient sharpness of tuning by itself, and a relatively thick secondary reed extending from said bar and having a weight at its end, said secondary reed being of a predetermined thickness and a predetermined length to have the same resonant frequency as said primary reed, the thickness of said secondary reed and the weight at its end being such as to impart predetermined sharpness of tuning to the unit without affecting the frequency and amplitude of the primary reed.

3. In a vibrating reed device; a vibrating reed unit comprising a bar mounted at its nodes to support the unit, a relatively thin primary reed extending from said bar, said reed being of a predetermined thickness and a predetermined length to have a predetermined resonant frequency but by virtue of its being thin having insufficient sharpness of tuning by itself, and a relatively thick secondary reed extending from said bar and having a weight at its end, said secondary reed being of a predetermined thickness and a predetermined length to have the same resonant frequency as said primary reed, the thickness of said secondary reed and the weight at its end being such as to impart predetermined sharpness of tuning to the unit without affecting the frequency and amplitude of the primary reed; and means for imparting energy to said primary reed to effect vibration of said unit.

4. In a vibrating reed device; a plurality of vibrating reed units arranged in a row and tuned to different frequencies, each of said units comprising a base portion mounted to support the unit, a relatively thin primary reed extending from said base portion, said reed being of a predetermined thickness and a predetermined length to have a predetermined resonant frequency but by virtue of its being thin having insufficient sharpness of tuning by itself, and a relatively thick secondary reed extending from said base portion and having a weight at its end, said secondary reed being of a predetermined thickness and a predetermined length to have the same resonant frequency as said primary reed, the thickness of said secondary reed and the weight at its end being such as to impart predetermined sharpness of tuning to the unit without affecting the frequency and amplitude of the primary reed; and electromagnetic means surrounding only the primary reeds of said units to impart energy to the primary reeds, whereby electrical energy of a frequency corresponding to the resonant frequency of one of said units will effect vibration of that unit.

5. In a device according to claim 4, each of said units having a bar from which the reeds extend, the bar having apertures as its nodes, a pair of parallel rods extending through the apertured bars of said units to support the same, and spacer means on said rods to render negligible the energy coupling between said units.

References Cited in the file of this patent

UNITED STATES PATENTS

| Number | Name | Date |
|---|---|---|
| 275,759 | Fischer | Apr. 10, 1883 |
| 1,653,794 | Whitehorn | Dec. 27, 1927 |
| 1,831,638 | Ranger et al. | Nov. 10, 1931 |
| 2,413,062 | Miessner | Dec. 24, 1946 |
| 2,433,160 | Rusler | Dec. 23, 1947 |
| 2,502,722 | Handler | Apr. 4, 1950 |
| 2,522,302 | Roth | Sept. 12, 1950 |

FOREIGN PATENTS

| Number | Country | Date |
|---|---|---|
| 83,690 | France | Dec. 22, 1868 |
| 416,578 | Germany | July 22, 1925 |